(12) United States Patent
Venable (10) Patent No.: US 8,139,249 B2
(45) Date of Patent: Mar. 20, 2012

(54) EVENT DRIVEN PLUGIN ARCHITECTURE FOR IMPORTING SCANNED IMAGE DATA INTO A PRODUCTION WORKFLOW

(75) Inventor: Dennis L. Venable, Marion, NY (US)

(73) Assignee: Xerox Corporation, Norwalk, CT (US)

( * ) Notice: Subject to any disclaimer, the term of this patent is extended or adjusted under 35 U.S.C. 154(b) by 1168 days.

(21) Appl. No.: 11/824,065

(22) Filed: Jun. 29, 2007

(65) Prior Publication Data

US 2009/0006610 A1    Jan. 1, 2009

(51) Int. Cl.
*G06F 3/12* (2006.01)

(52) U.S. Cl. .................. 358/1.15; 358/1.151; 358/1.14; 358/1.13; 358/474; 358/487; 715/474; 715/487; 715/505; 717/101; 717/107; 717/120; 717/168; 717/172

(58) Field of Classification Search .................. 358/1.15, 358/1.14, 1.13, 474, 487, 505; 715/762, 715/771; 717/101, 107, 120, 168, 172–178
See application file for complete search history.

(56) References Cited

U.S. PATENT DOCUMENTS

| | | | |
|---|---|---|---|
| 6,199,081 B1 | 3/2001 | Meyerzon et al. | |
| 6,707,950 B1 | 3/2004 | Burns et al. | |
| 7,129,961 B1 | 10/2006 | Samra | |
| 7,254,743 B2 * | 8/2007 | Iida et al. | 714/15 |
| 2004/0177337 A1 * | 9/2004 | Iida et al. | 717/104 |
| 2006/0055965 A1 * | 3/2006 | Nakamura et al. | 358/1.15 |
| 2008/0183754 A1 * | 7/2008 | Kitada | 707/104.1 |

* cited by examiner

*Primary Examiner* — Jacky X Zheng
(74) *Attorney, Agent, or Firm* — Fay Sharpe LLP (57) ABSTRACT

Systems and methods are described that facilitate importing scanned image data into a production workflow, in accordance with various features described herein. A plurality of loosely-coupled, dynamically loaded plugins can be defined in a configuration file for a given production scanning job. The plugins can be invoked in response to a trigger with which each plugin is associated, and triggers can be associated with different phases of the production workflow, such as image data acquisition (importation), data filtering (pre-scanning), image analysis (scanning), and metadata processing (post-scanning). In this manner, the overarching scanning architecture need not have direct knowledge of which plugins are triggered, or even present, and custom plugins as well as standard plugins can be provided for each production scanning job.

16 Claims, 5 Drawing Sheets

EVENT DRIVEN PLUGIN ARCHITECTURE FOR IMPORTING SCANNED IMAGE DATA INTO A PRODUCTION WORKFLOW

BACKGROUND

The subject application relates to document scanning, and more particularly to high-speed production scanning of large numbers of documents. For instance, a company such as an insurance company, hospital, law firm, or any other company with a large number of documents requiring scanning for conversion into electronic files, can contact a production scanning operation to have the documents scanned. Total page count may be on the order of thousands, millions, etc., which the customer has in file cabinets and desires to have scanned into e-files. The customer may ship the documents to a production scanning facility, where they are placed in high-speed scanners and processed to extract, for instance, account numbers, ID numbers, or other information, and scanned and stored on a storage medium, such as CDs, floppy disks, flash memory, or some other suitable storage medium. The e-files are then shipped back to the customer. The hard copies originally provided by the customer can be stored, destroyed, returned to the customer, etc.

Conventional production scanning operations require custom generation of software for each scanning job and do not provide any mechanism for division of labor, such as document preparation, scanning, specific information retrieval, etc. Accordingly, there is an unmet need for systems and/or methods that facilitate overcoming the aforementioned deficiencies.

BRIEF DESCRIPTION

In accordance with various aspects described herein, systems and methods are described that facilitate performing high-speed, high-volume production document-scanning jobs. For example, a method for importing scanned image data into a production workflow comprises receiving an XML configuration file having information describing a plurality of image processing plugins, registering zero or more plugins for each of a plurality of event triggers specified in the XML configuration file, and sequentially initiating the plurality of event triggers to invoke respective registered plugins. The method further comprises processing the scanned images using the invoked plugins.

According to another feature described herein, a system that facilitates importing scanned image data into a production workflow comprises a processor that receives a configuration file that describes a plurality of image processing plugins, and generates trigger event messages, a memory that stores the configuration file, and a plugin handler that receives a trigger event messages from the processor and invokes one or more plugins registered to the trigger event message.

Yet another feature relates to a scanning platform, comprising a scanner that generates electronic images of documents for information retrieval, a memory that stores a received configuration file, which defines an action for at least one plugin that allows the plugin to execute custom code that is at least one of a script or compiled code, and a plugin handler that recognizes an event trigger and invokes one or more plugins registered to the event trigger to process image data.

BRIEF DESCRIPTION OF THE DRAWINGS

FIG. 1 is an illustration of a system that depicts a plurality of components, such as may be employed in a production scanning operation or the like;

DETAILED DESCRIPTION

In accordance with various features described herein, systems and methods are described that facilitate event-driven plugin processing of scanned image data to import the image data into a production workflow. For example, an imaging services platform (ISP) can provide a suite of tools for the management and execution of production image scanning and metadata capture. A production imaging manager (PIM) is often responsible for the processing of scanned image data in production volumes using workflows defined during configuration. An early step in a typical production workflow is the introduction of electronic image data from one or more sources, such as scanning hardcopy files, reception of images from fax, ftp or http transport, etc. In this document, the process of injecting electronic image data into the production workflow is called "Scan Import," "ScanImport," or the like. Conventional imports have been custom-built for each production scanning job and can be efficient in operation, but require significant development and maintenance resources. A next-generation production workflow system is described herein, which supports significantly higher volumes while requiring minimal development and maintenance resources. The architecture uses configuration and dynamic loading of plugins to customize for each new contract or job, and an event or trigger mechanism for communication between plugins with minimal coupling there between.

Generally, a plurality of loosely-coupled independent plugins are employed, which are dynamically invoked without requiring a main service (e.g., the ScanImport service) to have direct knowledge of the plugins. An event mechanism is utilized to trigger execution of the plugins, which permits separation of functionality via separation of plugin triggers. For instance, an import plugin can be triggered once per production scanning job to generate a list of images, and can look for data from a variety of sources. Separate plugins can be included in a software package, each of which looks for a different data source (e.g., TIFF files, jpeg files, directory data, scanned image data, ZIP files, empty files, etc.). Each of the Import plugins is triggered by a single event, such as an "Import" trigger message transmitted by the main service. Pre-scan plugins can be called once per job, and can allow for pre-processing of data prior to image-specific processing. Inscan plugins then process each image. For instance, upon transmission of an "Inscan" trigger message, a plurality of inscan plugins are activated for each type of data source detected during the import phase (e.g., TIFF files, jpeg files, directory data, scanned image data, ZIP files, empty files, etc.). Images are loaded into memory and all plugins triggered by the event are called. In this manner, multiple image processing operations can be supported without additional disk I/O requirements. Post-scan plugins can be invoked once to process metadata associated with the images and collected during the in-scan phase.

Plugin definitions and program code are included in an XML configuration file that is loaded into the ScanImport system during an initialization and setup phase. The XML file associates plugins with respective triggers, and plugins with a common trigger are executed in an order indicated in the XML configuration file. Plugins are not directly invoked by the service or by other plugins, but rather the service and/or a given plugin can output a trigger to which one or more plugins subscribe, and the subscribing plugins are invoked thereby. That is, the service and/or plugin sending out the trigger message need not have knowledge of which plugins will be triggered. The service understands the four triggers associated with the phases of operation: Import, PreScan, InScan, and PostScan. But, plugins can activate other custom plugins by invoking custom triggers.

Figure 1:
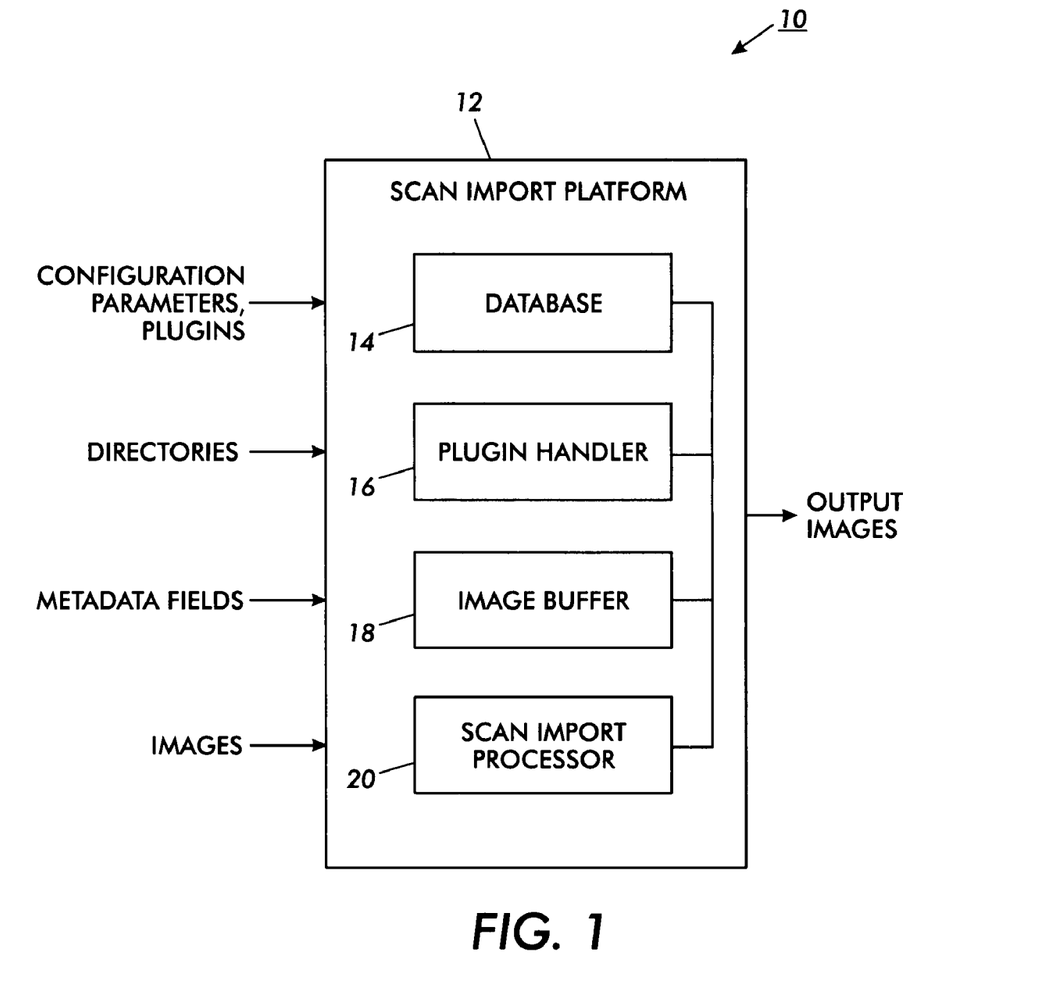

With reference to FIG. 1, a system 10 is illustrated that depicts a plurality of components, such as may be employed in a production scanning operation or the like. The system 10 comprises a ScanImport platform 12 with a plurality of components, including a database 14, a plugin handler 16, an image buffer 18, and a processor 20. The ScanImport platform 12 receives information such as configuration parameters and/or plugins (e.g., portions of software that perform a specific function), directory information, metadata field information, document images, and the like. Received information can be stored in the database 14 and/or the image buffer 18, as appropriate. The ScanImport platform 12 copies files from a directory, which has been written to by one or more scanning applications, into a directory structure supported by the services invoked by a production imaging manager, such as the ScanImport processor 20. ScanImport can be used to apply additional intelligence as well, such as scanning image data for barcodes, acquiring metadata from database lookups, etc. The functionality of ScanImport is implemented in simple plugins that can be mixed and matched via a configuration file to provide all necessary functionality. The vScanImport embodiment has a rich set of plugins already provided, and developers can create their own plugins to add additional functionality as needed. Plugins may be written with re-usability in mind, and the ScanImport configuration file contains any information necessary to configure each plugin. Additional tools can be provided to simplify the generation of the configuration file.

The plugins to be invoked by vScanImport are defined in an XML file that is stored in the workflow configuration received by the platform 12, and which may then be stored in the database 14. This configuration file can be manually constructed in development. Additionally or alternatively, a tool called vScanImportConfig can be provided as part of the PIM tool set, which greatly simplifies configuration. When the configuration XML is loaded, a class known as the Plugin Handler 16 registers each plugin into an internal registry, which can also be stored in the database 14. The ScanImport processor 20 need not specifically invoke plugins by name or class. Rather, the ScanImport processor 20 sends a message, or a trigger, to the Plugin Handler 16, which causes all plugins that are registered under the specific trigger name to be invoked. In this manner, the ScanImport processor 20 may be isolated from details about any specific plugin.

Within the configuration XML, each plugin is associated with a trigger (or event). According to an example, the ScanImport processor 20 knows about 4 triggers: "Import", "PreScan", "InScan", and "PostScan," which are the triggers used by the ScanImport processor 20 to trigger all processing. In addition to setup and initialization, the ScanImport processor 20 invokes the PluginHandler with these four triggers.

A plugin can invoke other plugins by sending trigger messages. Typically, these triggers are configured, but they need not be in some instances. Plugins can additionally document any trigger they invoke so that plugins will be configured with the correct trigger during configuration. When a new plugin is developed, a default trigger is specified in the plugin code. Although the default trigger can be employed to avoid confusion, the plugin can be configured to react to any trigger by modifying its configuration.

According to an example, documents are pre-processed and scanned, and then the system 10 is employed to glean information from the scanned documents. In this example, the system 10 comprises a plugin-based architecture that allows specific and configurable plugins to be written for a given job, and required plugins are plugged in as needed. In this sense, the ImportScan platform is software for capturing data for import into the system in a consistent manner.

Several advantages are achieved by the system 10, as well as the methods described below. For example, many ScanImport capabilities are provided by a pre-established collection of plugins, such that deployment of a new contract or job involves configuration, but additional coding is typically not required. This aspect significantly reduces development and maintenance resource consumption. Moreover, the available collection of plugins is very robust. For instance, an "example" vScanImport configuration can be provided available that can be "customized" by a user for individual contracts, thereby reducing resource requirements for configuration. According to some aspects, a tool (e.g., a vScanImport Configurator) is provided to simplify vScanImport configuration.

Additionally, custom plugins are easy to create, and a template program can be provided to a user to generate custom plugins. Plugins are reusable for many contracts and are very loosely coupled. For instance, an event-like mechanism is used to trigger plugin loading and processing, which allows plugins to be more generalized, thus saving on development resources. Plugins can easily invoke other plugins using the same event mechanism that vScanImport uses, and such invocations are typically configurable.

Image data is processed a minimum number of times (e.g., once) so that disk access per image is reduced, thus improving performance. The vScanImport framework can be applied to other parts of a PIM workflow, such as configurable delivery services. Moreover, the vScanImport architecture is simple to understand and the learning curve for configuration or plugin development is significantly shorter than previous implementations, thus allowing new hires to contribute to production much more quickly that would otherwise be possible.

According to one or more examples, plugins are provided for numerous operations, including without being limited to: importing source images to memory and/or generating image lists (e.g., an ImportToMemory plugin); extracting images from the image list whose file extensions are invalid (e.g., an ExtensionFileFilter plugin); counting a number of images that are front-side scans as opposed to back-side scans (e.g., a CountDuplex plugin); detecting blank pages (e.g., a BlankPageDetection plugin); reading each image and storing image attributes in an image object (e.g., a LoadImage plugin); scanning images for barcodes and metadata (e.g., a ScanBarcodes plugin); generating file names to which source images are copied (e.g., a CreateOutputNames plugin); copying files from the source directory to a file storage location understood by the production imaging manager known as a content partition (e.g., a CopyFiles plugin); propagating metadata specified on slipsheets across all images in the scanning job (e.g., a PropagateMetadata plugin); applying a database lookup to metadata identified by a slipsheet (e.g., a SlipsheetDatabaseLookup plugin); creating a file to store the image attributes and collected metadata in the content partition, with the name of the source image file and a .dat extension (e.g., a CreateDAT plugin); writing metrics to the database (e.g., a ReportStats plugin); analyzing barcodes to determine appropriate action based on the barcode and values encoded therein (e.g., a ConfigurableBarcodes plugin); etc.

According to related examples, one or more hierarchical constraints may be applied to the plugins to ensure that they are invokes in a logical order. For instance, classes of plugins are invoked according to the order of the triggers to which they are registered (e.g., Import, PreScan, InScan, and PostScan). However, within a given class, it may be desirable to ensure that a particular plugin is invoked and/or executed before a particular other plugin having the same trigger. To further this example, an ExtensionFileFilter plugin may be invoked before a CountDuplex plugin to ensure that invalid images are rejected before the CountDuplex plugin counts them, thus saving time and resources. This is so even though the ExtensionFileFilter plugin and the CountDuplex plugin share a common trigger (e.g., PreScan). According to another example, a CreatePluginNames plugin may be invoked prior to a CopyFiles plugin and/or a CreateDAT plugin to generate output file paths to be used by the CopyFiles plugin and/or the CreateDAT plugin. It will be understood that the foregoing examples illustrate a few instances of common-trigger plugin hierarchical constraints, and the other similar common-trigger orderings and/or hierarchies are possible.

The XML configuration file defines the configuration of the vScanImport service. ScanImport is a single step in a PIM workflow; the XML configuration file is specified when ScanImport is configured as part of a workflow, The information within the configuration file serves several purposes. For example, the configuration file specifies what plugins are to be made available to vScanImport, the trigger to which each plugin is to react, the order in which plugins that share the same trigger are invoked, etc. Additionally, the configuration file specifies where vScanImport can load the executable code for the plugin as well as any configuration data specific to that plugin. A configuration application (e.g., vScanImportConfig) can be used to create the configuration file, and/or the file can be created manually.

Below is a simplified example of a configuration file that extracts .tiff and/or jpeg files from a source directory and saves them to a destination directory defined or identified in the workflow configuration.

```
<Plugins>
    <Plugin name="ImportToMemory" displayName="Import Inputs To Memory" trigger="Import">
    <DLL>XeroxScanImportPlugins.ImportToMemory@XeroxScanImportPlugins.dll</DLL>
    </Plugin>
    <Plugin name="ExtensionFileFilter" displayName="Extension File Filter" trigger="PreScan">
        <SupportedExtensions>tif;tiff;jpg;jpeg</SupportedExtensions>
    <DLL>XeroxScanImportPlugins.ExtensionFileFilter@XeroxScanImportPlugins.dll</DLL>
    </Plugin>
    <Plugin name="CreateOutputNames" displayName="Create Output Names" trigger="PostScan">
    <DLL>XeroxScanImportPlugins.CreateOutputNames@XeroxScanImportPlugins.dll</DLL>
    </Plugin>
```

-continued

```
    <Plugin name="CopyFiles" displayName="Copy Files" trigger="PostScan">
    <DLL>XeroxScanImportPlugins.CopyFiles@XeroxScanImportPlugins.dll</DLL>
    </Plugin>
</Plugins>
```

There are 4 plugins specified in the above configuration, namely, ImportToMemory, ExtensionFileFilter, CreateOutputNames, and CopyFiles. Thus, upon receiving a configuration file, the ScanImport processor 20 sends an import trigger to the plugin handler 16, which invokes the ImportToMemory plugin to import the image data to the database 14. The processor 20 then sends a PreScan trigger message that triggers all pre-scan-registered plugins; in this case, the ExtensionFileFilter plugin is triggered to flag and/or remove any image objects whose file extensions are not valid in order to mitigate resource and time expenditure by later plugins. The processor then sends the InScan trigger to invoke all inscan plugins. However, in this example there are no inscan plugins specified in the configuration so no actions take place. The processor then sends a Post-scan trigger message to the plugin handler, which invokes all post-scan plugins designated in the configuration file. In this case, the plugin handler invokes the CreateOutputNames plugin and the CopyFiles plugin, sequentially. The order of plugin invocation for plugins having the same trigger is also specified in the configuration parameters. The XML configuration file has a root element called "Plugins," which contains a list of elements identifying each plugin being configured.

FIGS. 2-5 illustrate one or more methods related to importing scanned image data into a production workflow using event-driven plugins, in accordance with various features. While the methods are described as a series of acts, it will be understood that not all acts may be required to achieve the described goals and/or outcomes, and that some acts may, in accordance with certain aspects, be performed in an order different that the specific orders described.

Figure 2:
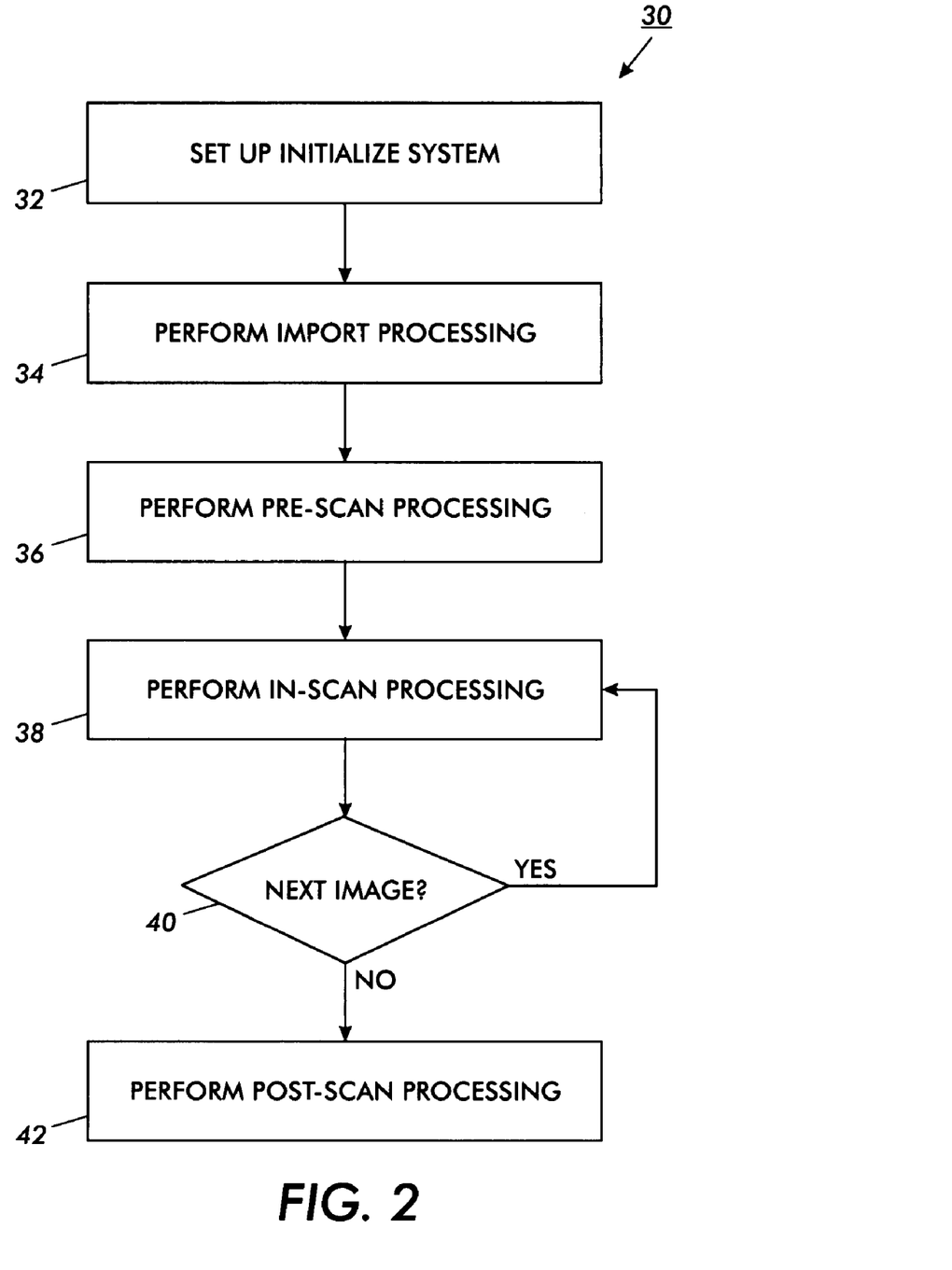
FIG. 2 is an illustration of a method of invoking plugins within vScanImport (an embodiment of the disclosed invention), in accordance with various aspects.

FIG. 2 is an illustration of a method 30 of invoking plugins within vScanImport, in accordance with various aspects. The method facilitates performing a variety of functions, such as invoking processes for copying input images into a production imaging manager directory, reading barcodes and/or dataglyphs, performing database lookups for metadata, performing image processing, etc. At 32, a ScanImport system is set up and initialized. That is, a ScanImport platform or the like loads configuration data to setup the service (e.g., vScanImportService). Configuration information is loaded from service calling parameters, and XML data is obtained from the configuration database. At 34, import processing is performed. For instance, a plugin is invoked to generate a list of memory objects (vImage), which represents images to be processed. This plugin can be custom-implemented for each contract.

At 36, pre-scan processing is executed, wherein plugins are invoked to process operations that do not require image data, such as testing for valid filename extensions. At 38, in-scan processing is performed. For instance, plugins are invoked on each image individually to process image data. Operations include slipsheet detection, barcode scanning, etc. It will be appreciated that the plugin invocation at 36 and/or 38 can be optional, depending on the scanning job being executed.

At 40, a determination is made regarding whether one or more images remain to be processed. If so, the method reverts to 38 for further iteration of the in-scan processing. If no other images remain to be processed, then at 42, post-scan processing is performed. For example, plugins can be invoked that typically operate on data collected during in-scan processing. Examples include, without being limited to, merging of multiple jobs, propagation of metadata, creation of DAT files, etc. These plugins may be optional in some cases, while in other examples at least one is employed to copy source image data into a destination directory.

Figure 3:
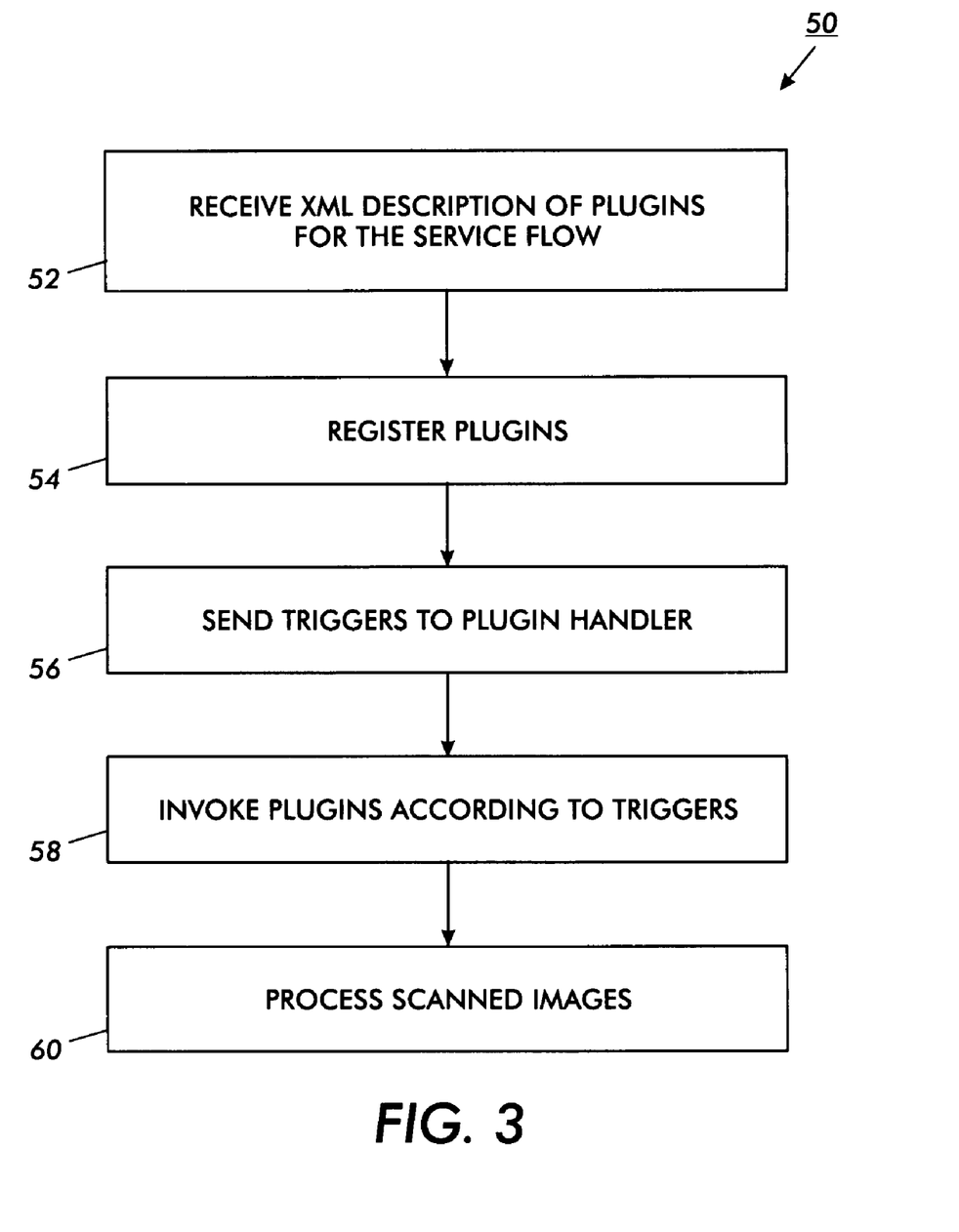
FIG. 3 is an illustration of a method for processing scanned images in a production scanning job using configuration information to trigger one or more software plugins, in accordance with various aspects.

FIG. 3 is an illustration of a method 50 for processing scanned images in a production scanning job using configuration information to trigger one or more software plugins, in accordance with various aspects. At 52, an XML description of the plugins for a given service flow (e.g., a production scanning job) is received. The XML description may be received as part of a configuration information package. The plugins are then registered and stored to persistent memory, at 54. At 56, triggers are sent to a plugin handler. For example, each plugin can be associated with a trigger, and each trigger can be associated with multiple plugins.

At 58, plugins are invoked according to their triggers. For instance, ImportScan plugins can be triggered first, wherein each import plugin is a software package for capturing data for importation into the system in a consistent manner, regardless of client inconsistency in document format (e.g., email vs. pdf scan, ftp document, etc.). Scanned images can then be processed at 60.

According to an example, a number of ImportScan plugins can address various file types (e.g., TIFF, jpeg, FTP, ZIP files, etc.). Additionally, an ImportScan plugin can be provided with a routine for detecting whether a file is empty. In this manner, a determination can be made at the import stage regarding whether a file requires further processing or can be ignored.

PreScan plugins can be triggered after the ImportScan plugins, and can execute instructions for image validation (e.g., valid file extension names, etc.). InScan plugins follow PreScan plugins, and need not load an image of a document into memory more than once, which provides a performance advantage over conventional systems that require multiple writing stages when processing thousands upon thousands of pages. Finally, PostScan plugins can be invoked to export electronic document data to a specific destination directory. Moreover, plugins within a given class (e.g., ImportScan, PreScan, InScan, PostScan, etc.) can be triggered in an order in which they are specified in the configuration file during setup and initialization.

Figure 4:
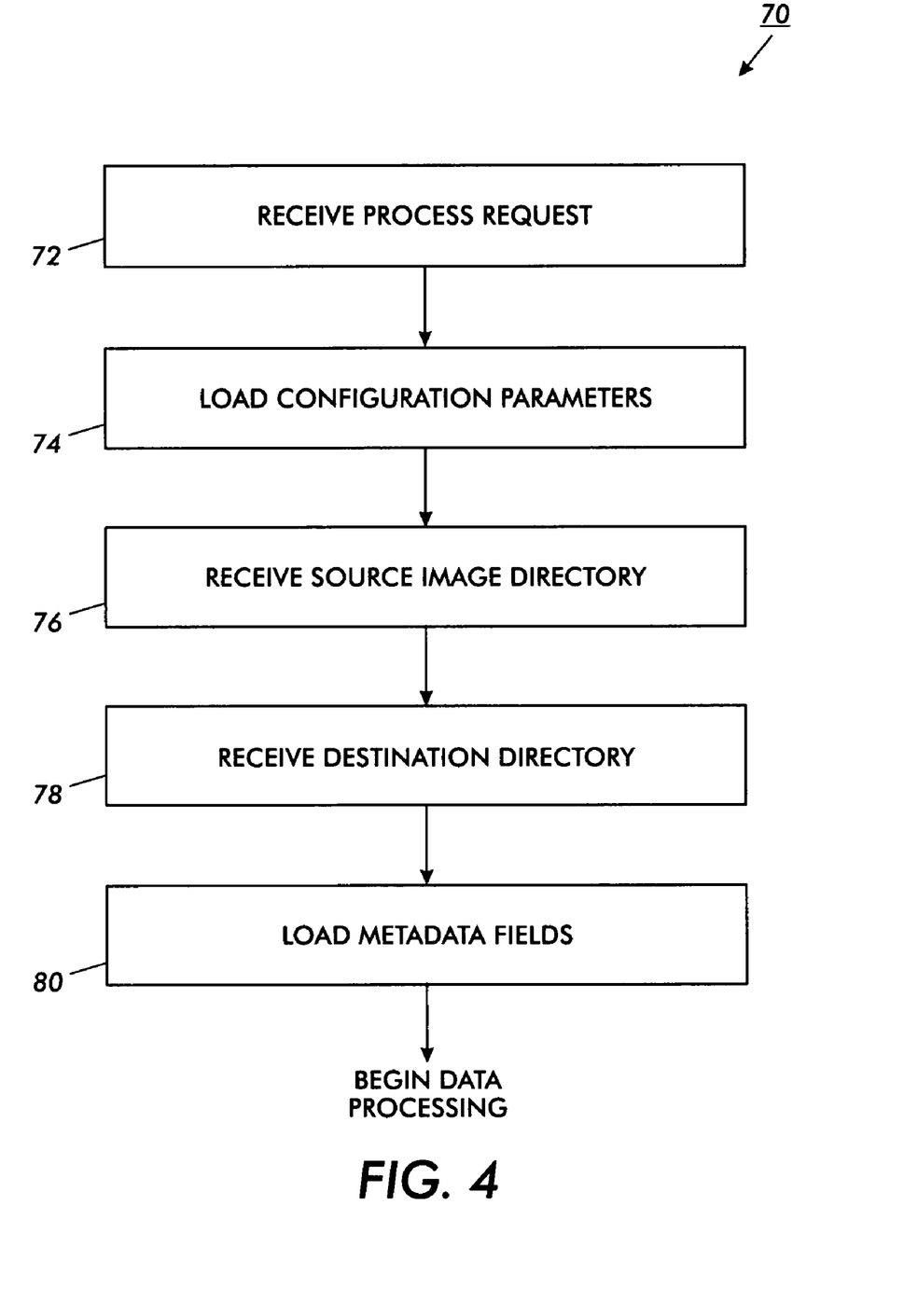
FIG. 4 is an illustration of a method of setting up and initializing a ScanImport system, in accordance with various aspects described herein.

FIG. 4 is an illustration of a method 70 of setting up and initializing a ScanImport system, in accordance with various aspects described herein. At 72, a process request is received, which causes the system to enter a setup and initialization phase. At 74, configuration parameters are loaded. For instance, configuration file can be loaded into the system, and can comprise XML information describing any and all plugins to be employed in the service flow. At 76, a source image directory is obtained. The source image directory is read from a scan service, such as a preliminary scanning service that scans documents prior to initialization of the ScanImport service.

At 78, a destination directory is identified, which is the directory to which scanned image information is to be output, and which is read from the configuration information for vScanImport. At 80, a configuration database is queried to load metadata fields associated with the particular production scanning job to be performed. The metadata fields are available to the plugins as a property on the ScanImport service. Once the metadata fields have been loaded, the system is ready to begin data processing.

Figure 5:
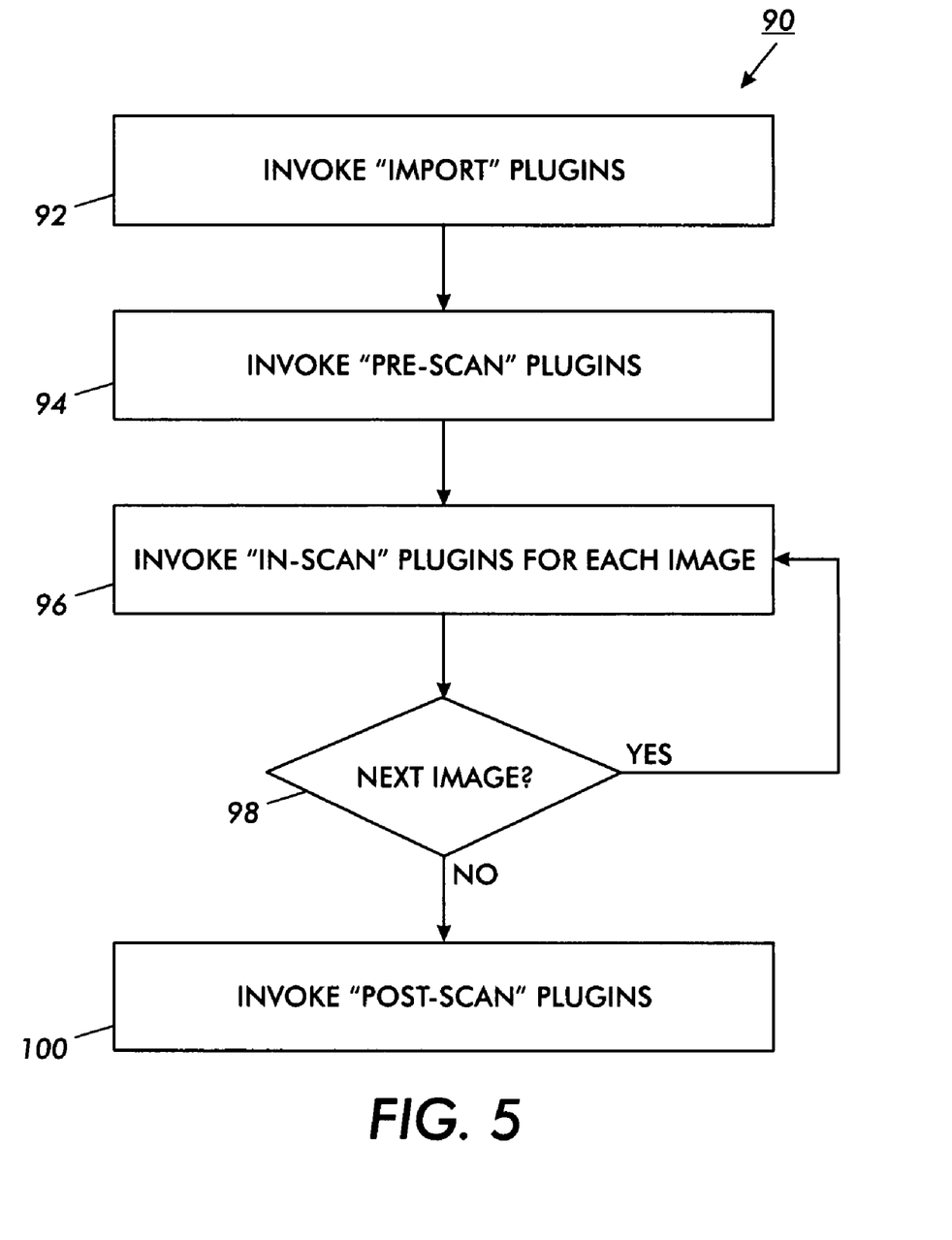
FIG. 5 illustrates a method of processing image data using independent, loosely-coupled, event-triggered plugins, in accordance with one or more features described herein.

FIG. 5 illustrates a method 90 of processing image data using independent, loosely-coupled, event-triggered plugins, in accordance with one or more features described herein. Plugins are dynamically invoked, and the main vScanImport service need not have direct knowledge of the functionality of the plugins. An event mechanism is used to trigger the execution of plugins; for example, vScanImport may employ four types of events: Import, PreScan, InScan, and PostScan. The separation of events into the four defined types allows vScanImport functionality to be separated in scope. Import plugins are called once for the job and generate a list of images that defines the job. Import plugins can look for data from directories, zip files, TIFF files, jpeg files, ftp files, etc. PreScan plugins are called once for the job and allow pre-processing of image data prior to the image-specific processing. An example of preprocessing is checking for valid file extensions. InScan plugins process each image of the job. The image is loaded into memory and all plugins triggered by the event are called. This allows the support of many image processing operations with no additional disk I/O requirements. PostScan plugins are called once for the job and are used to process metadata collected by earlier processing. For example, metadata collected from barcode scanning can be propagated to all images in a PostScan plugin.

XML configuration is used to identify which plugins are associated with each event, as well as the order they are invoked when the event is fired. Plugins need not be directly invoked by vScanImport or other plugins, but rather plugins subscribe to (e.g., are registered to) a specific event that will trigger their execution. More than one plugin can be invoked by a single event, and plugins can invoke other plugins by firing custom events, which are usually defined in configuration data. Additionally, an action mechanism is available on some plugins that allows the operation of the plugin to be customized with other dynamically loaded DLLs, which can be less complex than vScanImport plugins.

Returning to the method, at 92, one or more Import plugins are invoked, which are plugins that have been registered with the event trigger "Import." The Import plugin(s) generate a memory list of images to be processed, and different engagements can acquire the image list in different ways. At 94, PreScan plugins (e.g., plugins that have been registered with the PreScan trigger) are invoked. The list of available images is accessible as a property of the service, which allows some operations to be invoked prior to scanning of the images.

At 96, plugins that have been registered with the InScan trigger are invoked and a per-image basis. For instance, the image object can be provided as a parameter, barcode scanning is performed, etc. A determination regarding whether more images remain to be processed is performed, at 98. If one or more images remain to be processed, then the method reverts to 96 for another iteration if the InScan plugin(s). If no other images remain to be processed, then at 100, PostScan plugins are invoked. PostScan plugins can include, for instance, metadata propagation, file copying, DAT file generation, and the like, without being limited thereto. For example, a file copying plugin can copy the image data from the source directory to the destination directory with appropriate naming.

It will be appreciated that the foregoing acts and/or methods may be performed in a substantially reverse order to achieve a substantially reverse operation, such as exporting data from a destination directory and the like, in accordance with one or more features.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of importing scanned image data into a product workflow, comprising:

receiving a configuration file having information describing a plurality of image processing plugins;

registering at least one received image processing plugin for each of a plurality of trigger events specified in the configuration file, which even triggers include at least one of an Import trigger event, a Pre-scan trigger event, an In-scan trigger event, and a Post-scan trigger event;

dynamically invoking, with one or more processors, respective registered plugins responsive to a sequential initiation of the plurality of event triggers without requiring a main service to have direct knowledge of a function associated with the respective registered plugins, wherein the function associated with the respective plugin is separate from the trigger associated with the plugin; and processing the scanned images using the invoked plugins, wherein the configuration file associates plugins with event triggers and an order in which plugins associated with a common trigger are to be invoked relative to each other when the common trigger occurs.

2. The method of claim 1, further comprising loading to memory configuration parameters for a production scanning job.

3. The method of claim 2, further comprising receiving source image directory information that identifies a source directory from which images are to be imported for processing.

4. The method of claim 3, further comprising receiving destination directory information that identifies a destination directory to which processed images will be exported.

5. The method of claim 4, further comprising loading into memory metadata related to images to be processed.

6. The method of claim 1, further comprising invoking at least one Import plugin that generates a list of image objects that represent images to be processed.

7. The method of claim 6, further comprising invoking at least one Pre-Scan plugin that performs operations that do not require image data.

8. The method of claim 7, further comprising invoking at least on In-Scan plugin that processes an image to extract data specified in the In-Scan plugin definition.

9. The method of claim 8, further comprising invoking at least one Post-Scan plugin that evaluates data extracted by the In-Scan plugin and copies source image data into a destination directory.

10. A system that facilitates importing scanned image data into a production workflow, comprising:

a processor that receives a configuration file that describes a plurality of image processing plugins, and generates trigger event messages, wherein one or more of the plurality of plugins is registered to a trigger event message, which trigger event message is at least one of an Import trigger event, a Pre-scan trigger event, an In-scan trigger event, and a Post-scan trigger event;

a memory that stores the configuration file; and a plugin handler that receives the trigger event message from the processor and dynamically invokes one or more plugins registered to the trigger event message without requiring a main service to have direct knowledge of a function associated with the respective registered plugins;

wherein the function associated with the respective plugin is separate from the trigger associated with the plugin, and wherein the plugin handler invokes plugins having a common event trigger in an order specified in the configuration file when the common trigger occurs.

11. The system of claim 10, wherein the plugin handler invokes at least one Import plugin that generates a list of image objects that represent images to be processed.

12. The system of claim 11, wherein the plugin handler invokes at least one Pre-Scan plugin that performs operations that do not require image data.

13. The system of claim 12, wherein the plugin handler invokes at least on In-Scan plugin that processes an image to extract data specified in the In-Scan plugin definition.

14. The system of claim 13, wherein the In-Scan plugin definition specifies a type of data to be extracted comprising at least one of TIFF-formatted data, jpeg-formatted data, pdf-formatted data, ftp-formatted data, and ZIP-formatted data.

15. The system of claim 13, wherein the plugin handler invokes at least one Post-Scan plugin that evaluates data extracted by the In-Scan plugin and copies source image data into a destination directory.

16. A scanning platform, comprising:

a scanner that generates electronic images of documents for information retrieval;

a memory that stores a received configuration file, which defines an action for at least one plugin that allows the plugin to execute custom code that is at least one of a script or compiled code, and associates one or more plugins with respective trigger events to which the one or more plugins are registered, which trigger events include one or more of an Import trigger event, a Pre-scan trigger event, an In-scan trigger event, and a Post-scan trigger event; and a plugin handler that recognizes an event trigger and dynamically invokes one or more plugins registered to the event trigger to process image data without requiring a main service to have direct knowledge of a function associated with the respective registered plugins;

wherein the function associated with the respective plugin is separate from the trigger event for which the respective plugin is registered, and wherein the configuration file associates plugins with event triggers and an order in which plugins associated with a common trigger are to be invoked relative to each other when the common trigger occurs.

* * * * *